United States Patent Office 3,035,059
Patented May 15, 1962

3,035,059
SATURATED QUINOLINE AND INDOLE
DERIVATIVES
Erik F. Godefroi, Harper Woods, Mich., assignor to
Parke, Davis & Company, Detroit, Mich., a corporation of Michigan
No Drawing. Filed Dec. 21, 1959, Ser. No. 860,643
12 Claims. (Cl. 260—283)

This invention relates to certain new heterocyclic compounds and to methods for producing the same. More particularly, the invention relates to substituted saturated heterocyclic compounds and acid addition salts thereof which, in their free base form, have the following formula,

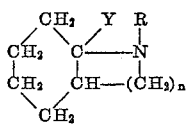

where Y is a phenyl, 2-thienyl or 2-furyl radical, R is hydrogen or a lower alkyl radical, preferably a methyl or ethyl group, and $n$ is 2 or 3. Some examples of the pharmaceuticaly acceptable acid addition salts of these compounds are the mineral acid salts such as the hydrochloride, hydrobromide, sulfonate and phosphate; the organic acid salts such as the phenyl sulfonate, p-toluene sulfonate, acetate, benzoate, tartarate and citrate; and salts with other strong acids such as the sulfamate.

In accordance with the invention, the aforementioned compounds and their acid addition salts can be produced in a number of ways. The substances wherein R represents hydrogen are preferably prepared by introducing the radical Y into an unsaturated compound of formula,

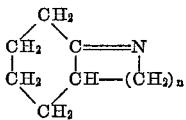

where $n$ is 2 or 3. This is most conveniently accomplished by reacting the unsaturated compound with a compound of formula, Y—P, where P is an alkali metal or —Mg-halide, under anhydrous conditions and decomposing the resulting product by treatment with at least one equivalent of water. Some examples of the Y—P compounds are phenyl lithium, 2-thienyl lithium, 2-furyl lithium, phenyl-magnesium bromide, 2-thienylmagnesium bromide and 2-furylmagnesium bromide. The initial phase of the reaction is carried out in a non-hydroxylic organic solvent such as diethyl ether, dipropyl ether, tetrahydrofuran, benzene, toluene, xylene or the like. The temperature is not particularly critical and can be varied from about −10 to 75° C., the most customarily used temperature being room temperature to about 40 or 45° C. The proportions of the reactants is likewise not critical, but in most cases equivalent amounts or a slight excess of the Y-alkali metal or Y-magnesium halide are used. The decomposition phase of the reaction can be carried out using water alone, aqueous acid, aqueous ammonium chloride, or other water containing solutions which will furnish at least one equivalent of water. The amount of water used in the decomposition phase is not critical except that at least one equivalent must be used to effect decomposition of the intermediate product.

The substances wherein R is a lower alkyl group are most conveniently prepared by alkylation of the corresponding amine compound of formula,

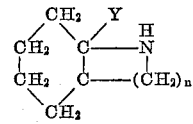

where Y is a phenyl, 2-thienyl or 2-furyl radical and $n$ is 2 or 3. This alkylation can be carried out in a number of ways. For example, the amino compound can be reacted with an alkyl ester such as a lower alkyl halide or lower dialkyl sulfate. Alternatively, the amino compound can be acylated with a lower fatty acid derivative such as the free acid or the acyl halide, anhydride or ester and the carbonyl group present in the resulting N-acyl compound of formula,

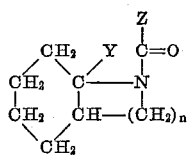

where Y is a phenyl, 2-thienyl or 2-furyl radical, $n$ is 2 or 3, and Z is the group R less one carbon atom; reduced to a methylene group. The reduction can be carried out catalytically or chemically. The preferred method is the chemical method using lithium aluminum hydride under anhydrous conditions in a non-hydroxylic organic solvent such as ether, tetrahydrofuran, benzene and the like. The compounds wherein R is a methyl group can also be prepared by reacting the amino compound with formaldehyde and formic acid.

The substances wherein R is a lower alkyl group can also be prepared by reacting a nitrile of formula,

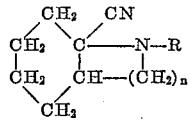

where $n$ is 2 or 3; with a Y-magnesium halide of formula, $$Y—Mg—X$$

where Y is a phenyl, 2-thienyl or 2-furyl radical and X is a halogen atom preferably bromine; under anhydrous conditions and decomposing the resulting product by treatment with at least one equivalent of water. The initial phase of the reaction is carried out in a non-hydroxylic organic solvent such as diethyl ether, dipropyl ether, tetrahydrofuran, benzene, toluene, xylene or the like. The temperature is not particularly critical and can be varied from about −10 to 75° C., the most customarily used temperature being room temperature to about 40 or 45° C. The proportions of the reactants is likewise not critical, but in most cases equivalent amounts or a slight excess of the Y-magnesium halide are used. The decomposition phase of the reaction can be carried out using water alone, aqueous acid, aqueous ammonium chloride, or other water containing solutions which will furnish at least one equivalent of water.

The acid addition salts can best be produced by reaction of the free base of the corresponding amine with the desired acid.

The substituted saturated heterocyclic compounds of the invention and their pharmaceutically acceptable acid addition salts possess useful medicinal properties. When administered to a living animal or person they produce a depressant-like effect upon the central nervous system coupled with a hypotensive effect. They can be used as anesthetics. They are also useful in the treatment of hyper-excitability in animals and humans. They can be administered by the oral or parenteral routes and in any of the customary pharmaceutical dosage forms.

The invention is illustrated by the following examples:

Example 1

27 g. of $\Delta^{1,8a}$-octahydroquinoline in 50 ml. of ether is added slowly with stirring to 0.5 mole of phenyl lithium in 400 ml. of ether and the resulting mixture heated under reflux for two hours. The reaction mixture is decomposed by the cautious addition of excess water and the ether phase separated. The ether phase is washed with two fresh portions of water, dried and the ether distilled. Distillation of the residue in vacuo yields the desired 8a-phenyl decahydroquinoline; B.P. 114–122° C. at 0.11 mm. or 115–117° C. at 0.09 mm.

The hydrochloride salt of 8a-phenyl decahydroquinoline can be prepared by dissolving the free base in ether and treating the solution with an excess of dry hydrogen chloride. After recrystallization from methanol, 8a-phenyl decahydroquinoline hydrochloride melts at 285–6° C. The hydrobromide salt can be prepared in the same way by substituting dry hydrogen bromide for the dry hydrogen chloride.

The $\Delta^{1,8a}$-octahydroquinoline used as the starting material can conveniently be prepared by the hydrolytic cyclization of 2-pyrrolidino-3-($\gamma$-aminopropyl)-$\Delta^{1,2}$-cyclohexene as follows:

A mixture consisting of 76 g. of 2-pyrrolidino-3-($\gamma$-aminopropyl)-$\Delta^{1,2}$-cyclohexene, 30 ml. of water and 2 ml. of 2 N sodium hydroxide solution is heated in a nitrogen atmosphere or a steam bath for one hour. The two phase system is vacuum distilled and the fraction boiling at 68–72° C./8 mm. collected.

Example 2

Formic acid (0.11 mole) and 4.35 g. (0.055 mole) of 37% formaldehyde are added to 10.15 g. of 8a-phenyl decahydroquinoline and the mixture heated on a steam bath until the evolution of carbon dioxide ceases, about two hours. The mixture is allowed to stand at room temperature and then treated with an excess of 5 N sodium hydroxide solution. The mixture is extracted with ether, the ether extract dried and the ether distilled. Distillation of the residue in vacuo yields the desired 1-methyl-8a-phenyl decahydroquinoline; B.P. 115–117° C. at 0.115 mm.

The hydrochloride salt is prepared by dissolving the free base in ether and treating the resulting solution with an excess of dry hydrogen chloride. The crude salt so obtained melts at about 160° C.

Example 3

5 ml. of acetic anhydride is added to 10.75 g. of 8a-phenyl decahydroquinoline in 50 ml. of benzene and the mixture allowed to stand at room temperature for several days. The reaction mixture is washed with water, then with 5% sodium bicarbonate solution, again with water and finally dried. The benzene is removed by distillation and the residue distilled to obtain the desired 1-acetyl-8a-phenyl decahydroquinoline; B.P. 150–155° C. at 0.13 mm.

6.1 g. of 1-acetyl-8a-phenyl decahydroquinoline is added to 3 g. of lithium aluminum hydride in 50 ml. of ether, the mixture stirred for five hours and then allowed to stand overnight. The reaction mixture is decomposed by the addition of water, 20% sodium hydroxide solution and then more water. The ether layer is removed, the ether evaporated and the residue distilled in vacuo to obtain the desired 1-ethyl-8a-decahydroquinoline; B.P. 120–3° C. at 0.125 mm.

The hydrochloride salt of 1-ethyl-8a-decahydroquinoline can be prepared by dissolving the free base in ether and treating the solution with an exces of dry hydrogen chloride. The salt before recrystallization melts at about 170° C.

Example 4

40 g. of $\Delta^{1,7a}$-hexahydroindole is added slowly with stirring to 0.5 mole of phenyl lithium in 500 ml. of ether and the resulting mixture stirred at room temperature for three hours. An excess of water is added carefully to the reaction mixture, and the organic phase separated and washed with two additional portions of water. The organic layer is dried, the ether distilled and the residue subjected to distillation in vacuo. The desired 7a-phenyl-octahydroindole is collected; B.P. 101–105° C./0.11 mm.

The hydrochloride salt of 7a-phenyl octahydroindole is prepared by treating an ether solution of the free base with an excess of hydrogen chloride. After recrystallization from methanol-ether mixture, the salt melts at 264–5° C. with a change in crystalline modification at 120–160° C.

Example 5

3.32 ml. of formic acid and 3.42 g. of formaldehyde are added to 0.04 mole of 7a-phenyl octahydroindole. A vigorous reaction takes place accompanied by the evolution of carbon dioxide. After the reaction subsides, the mixture is heated on a steam bath for a short time and then allowed to stand. 20 ml. of 5 N sodium hydroxide solution is added and the mixture extracted with ether. The ether extract is dried, the ether distilled and the residue distilled in vacuo to obtain the desired 1-methyl-7a-phenyl octahydroindole; B.P. 115–20° C. at 0.12 mm.

Example 6

5 ml. of acetic anhydride is added to 10.05 g. of 7a-phenyl octahydroindole in 50 ml. of benzene. The mixture warmed spontaneously. The reaction mixture is allowed to stand and then treated with 50 ml. of water. The benzene layer is removed, washed with sodium bicarbonate solution and then dried. The benzene is removed by distillation and the residue distilled in vacuo to obtain the desired 1-acetyl-7a-phenyl octahydroindole; B.P. 150–153° C. at 0.09 mm.

7.6 g. of 1-acetyl-7a-phenyl octahydroindole in 50 ml. of ether is added slowly with stirring to 4 g. of lithium aluminum hydride in 400 ml. of ether and the resulting mixture heated under reflux for five hours. The reaction mixture is decomposed by the cautious addition of water, then 20% sodium hydroxide solution and finally water. The ether solution is removed and the ether evaporated. Distillation of the residue under reduced pressure yields the desired 1-ethyl-7a-phenyl octahydroindole; B.P. 105–7° C.

The hydrochloride, hydrobromide, sulfate, sulfamate and p-toluene sulfonate salts can be prepared by treatment of an ether solution of the free base with at least one equivalent of the corresponding acid.

Example 7

157 g. of bromobenzene is added slowly to 18.1 g. of lithium in 1 liter of refluxing dry ether. After the addition has been completed, the reaction mixture is stirred for one hour and 95 ml. of thiophene added slowly to the solution of phenyl lithium. The reaction mixture is stirred for one half hour and then 120 g. of $\Delta^{1,8a}$-octahydroquinoline added slowly to the solution of 2-thienyl lithium. The reaction mixture is stirred overnight and then decomposed by the addition of 400 ml. of water. The organic phase is separated, washed with water and dried. The solvent is removed by distillation and the residue distilled in vacuo to obtain the desired 8a-(2-thienyl) decahydroquinoline; B.P. 100–5° C. at 0.01 mm.

The hydrochloride salt of 8a-(2-thienyl) decahydroquinoline prepared from the above described free base and hydrogen chloride melts at 270–1° C.

Example 8

3.6 g. of formic acid is mixed with 8 g. of 8a- (2-thienyl) decahydroquinoline and then 3.2 g. of 37% formaldehyde added. The reaction is strongly exothermic. After the reaction subsides the mixture is heated for three and a half hours on a steam bath. 42 ml. of dilute sodium hydroxide is added and the mixture extracted with three portions of ether. The combined ether extracts are dried, diluted to 500 ml. with ether and an excess of isopropanolic hydrogen chloride added to the solution of the 1-methyl-8a-(2-thienyl) decahydroquinoline. The ether is separated from the oily precipitate. The oil crystallizes on stirring with fresh ether. The 1-methyl-8a-(2-thienyl) decahydroquinoline hydrochloride is purified by recrystallization from methanol-ether mixture. The substance is hygroscopic. A sample melting at 133–4° C. analyzed correctly after drying.

*Example 9*

21 g. of 1-methyl-8a-cyanodecahydroquinoline in 20 ml. of dry ether is added dropwise to a solution of 2-thienylmagnesium bromide prepared from 30 g. of 2-bromothiophene in 20 ml. of dry ether and 6.2 g. of magnesium turnings in 250 ml. of dry ether. The reaction mixture is stirred for about three and a half hours at room temperature and decomposed by the addition of about 250 ml. of saturated ammonium chloride solution. The phases are separated and the organic layer washed with water. The organic solution is dried and the solvent removed by distillation. The residue is distilled in vacuo to obtain the desired 1-methyl-8a-(2-thienyl) decahydroquinoline; B.P. 108–116° C. at 0.02 mm. The yellow, viscous, oily free base is converted to the hydrochloride salt by adding excess isopropanolic hydrogen chloride to an ether solution of the free base; M.P. 273–6° C. Upon recrystallization from methanol-ether mixture the melting point falls to 143–4° C. The melting point is unchanged by recrystallization from ethanol-ether. Analysis indicates that the product is 1-methyl-8a-(2-thienyl) decahydroquinoline hydrochloride monohydrate.

The 1-methyl-8a-cyano decahydroquinolines used as the starting material can be prepared by reacting 27.4 g. of $\Delta^{1,8a}$-octahydroquinoline with 13.7 cc. of methyl iodide in acetonitrile to produce the methiodide quaternary compound and reacting the methiodide quaternary compound in 200 ml. of acetic acid with 12.2 g. of sodium cyanide in a small amount of water at 14° C. The product is isolated by pouring the reaction mixture into ice water, basifying the solution, extracting with ether and distilling the ether extract; B.P. 115–118° C. at 8 mm.

*Example 10*

3.9 g. of acetic anhydride is added with stirring to 7 g. of 8a-(2-thienyl) decahydroquinoline in 42 ml. of dichloromethane and the mixture allowed to stand for eighteen hours. The reaction mixture is washed with about one equivalent of 1 N hydrochloric acid and the organic layer then washed with 5% sodium bicarbonate solution until neutral. The organic layer is dried and the solvent evaporated to obtain the desired 1-acetyl-8a-(2-thienyl) decahydroquinoline. The latter compound is dissolved in dry ether and added slowly with stirring to 7 g. of lithium aluminum hydride in 500 ml. of dry ether. The mixture is stirred overnight and treated with about 7 ml. of water, then with about 5.3 ml. of sodium hydroxide solution and finally with 24.5 ml. of water. The mixture is filtered, the ether layer separated and the ether evaporated. The residue is distilled in vacuo and the fraction boiling at 85–105° C. at 0.009 mm. which contains the desired 1-ethyl-8a-(2-thienyl) decahydroquinoline collected.

The hydrochloride salt of 1-ethyl-8a-(2-thienyl) decahydroquinoline is obtained by treatment of an ether solution of the free base with an excess of isopropanolic hydrogen chloride.

*Example 11*

17 g. of 1-propyl-8a-cyanodecahydroquinoline in 10 ml. of dry ether is added dropwise with stirring to a refluxing solution of 2-thienylmagnesium bromide prepared from 28 g. of 2-bromothiophene in 15 ml. of dry ether and 5 g. of magnesium turnings in 200 ml. of dry ether. The mixture is stirred overnight and decomposed by the addition of about 350 ml. of saturated ammonium chloride solution. The organic phase is separated, washed with water, dried and the solvent distilled. The residue is flash distilled in vacuo and the distillate fractionated in vacuo to obtain the desired 1-propyl-8a-(2-thienyl) decahydroquinoline; B.P. 114–121° C. at 0.03 mm. The yellow product rapidly turns dark on standing.

Treatment of the free base of 1-propyl-8a-(2-thienyl) decahydroquinoline in ether with isopropanolic hydrogen chloride yields the hydrochloride salt.

The 1-propyl-8a-cyanodecahydroquinoline starting material can be prepared as described in Example 9 using propyl bromide instead of methyl iodide. It is a yellow liquid boiling at 127–132° C. at 15 mm.

*Example 12*

16 ml. of furan in an equal amount of ether is added to a solution of butyl lithium prepared from 28 ml. of n-butyl bromide in 30 ml. of ether and 4 g. of lithium in 250 ml. of ether. A solution of magnesium bromide (prepared by the reaction of 63 g. of ethylene dibromide in 30 ml. of ether to 0.26 mole of magnesium turnings in 250 ml. of ether) is added dropwise and the mixture stirred for three hours. 21 g. of 1-methyl-8a-cyanodecahydroquinoline is added dropwise with stirring to the 2-furylmagnesium bromide solution and the mixture stirred overnight. About 300 ml. of saturated aqueous ammonium chloride solution is added, the mixture filtered and the phases of the filtrate separated. The organic phase is washed with water, dried and the solvent distilled. The residue is fractionated under reduced pressure and the fractions boiling at 61–67° C. at 0.012 mm. and 67–72° C. at 0.01 mm. collected. Both fractions are the desired 1-methyl-8a-(2-furyl) decahydroquinoline.

The hydrochloride salt of 1-methyl-8a-(2-furyl) decahydroquinoline prepared by the action of isopropanolic hydrogen chloride on an ether solution of the free base and recrystallization from methanol-ether mixture melts at 207–8° C. with sublimation.

*Example 13*

24 ml. of furan in 15 ml. of ether is added to a solution of butyl lithium prepared from 58 ml. of n-butyl bromide and 6.9 g. of lithium in 500 ml. of ether. After stirring for about two and a half hours a solution of magnesium bromide (prepared from 62 g. of ethylene dibromide in 30 ml. of ether and 8.2 g. of magnesium turnings in 150 ml. of ether) is added. The reaction mixture is stirred for three hours and then 34 g. of 1-ethyl-8a-cyanodecahydroquinoline is added dropwise with stirring to the refluxing solution of 2-furylmagnesium bromide. The reaction mixture is stirred overnight and then treated with 500 ml. of saturated aqueous ammonium chloride solution. The organic phase is separated, washed with water and dried. The solvent is removed by distillation and the residue distilled in vacuo to obtain the desired 1-ethyl-8a-(2-furyl) decahydroquinoline; B.P. 87–91° C. at 0.02 mm.

The hydrochloride salt of 1-ethyl-8a-(2-furyl) decahydroquinoline is prepared by slowly adding isopropanolic hydrogen chloride to a well stirred dilute ether solution of the free base. The hydrochloride salt is collected and recrystallized from ethanol-ether mixture; M.P. 190–1° C.

The 1-ethyl-8a-cyanodecahydroquinoline starting material can be prepared by the procedure described in Example 9 for the preparation of the 1-methyl-8a-cyanodecahydroquinoline by using ethyl iodide instead of methyl iodide. The 1-ethyl-8a-cyanodecahydroquinoline is an orange liquid boiling at 120–5° C. at 9 mm.

*Example 14*

24 ml. of furan in 15 ml. of ether is added to a solution of butyl lithium prepared from 58 ml. of n-butyl bromide and 6.9 g. of lithium in 500 ml. of ether. After stirring for about two and a half hours a solution of magnesium bromide (prepared from 62 g. of ethylene dibromide in 30 ml. of ether and 8.2 g. of magnesium turnings in 150 ml. of ether) is added. The reaction mixture is stirred for three hours and then 37 g. of 1-propyl-8a-cyanodecahydroquinoline is added dropwise with stirring to the refluxing solution of 2-furylmagnesium bromide. The reaction mixture is stirred overnight and then treated with 500 ml. of saturated aqueous ammonium chloride solution. The organic phase is separated, washed with water, dried and the ether distilled. The residue is distilled under reduced pressure to obtain the desired 1-propyl-8a-(2-furyl) decahydroquinoline; B.P. 95–98° C. at 0.02 mm. or 92–5° C. at 0.014 mm.

This application is a continuation in part of application Serial No. 719,755, filed March 7, 1958, now abandoned.

What is claimed is:

1. A compound of the class consisting of a free base and its pharmaceutically acceptable acid addition salts, said free base of formula,

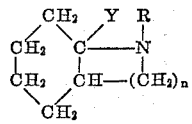

where Y is a member of the class consisting of phenyl, 2-thienyl and 2-furyl, R is a member of the class consisting of hydrogen and lower alkyl and $n$ is a whole number of 2 to 3.

2. A pharmaceutically acceptable acid addition salt of 8a-phenyl decahydroquinoline.
3. 8a-phenyl decahydroquinoline hydrochloride.
4. 8a-phenyl decahydroquinoline.
5. A pharmaceutically acceptable acid addition salt of 7a-phenyl octahydroindole.
6. 7a-phenyl octahydroindole hydrochloride.
7. 7a-phenyl octahydroindole.
8. 1-methyl-8a-phenyl decahydroquinoline.
9. 8a-(2-thienyl) decahydroquinoline.
10. 8a-(2-thienyl) decahydroquinoline hydrochloride.
11. 1-methyl-8a-(2-thienyl) decahydroquinoline hydrochloride monohydrate.
12. Process for the production of a compound of formula,

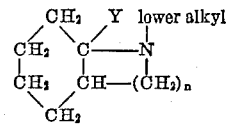

which comprises reacting a nitrile of formula,

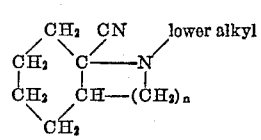

with a compound of formula,

under anhydrous conditions in a non-hydroxylic organic solvent and decomposing the resulting product by treatment with at least one equivalent of water; where Y is a member of the class consisting of phenyl, 2-thienyl and 2-furyl radicals, $n$ is a whole number of 2 to 3 and X is a halogen atom.

References Cited in the file of this patent
UNITED STATES PATENTS 2,566,259    Thistle et al. _____ Aug. 28, 1951

OTHER REFERENCES

Gilman et al.: J. Am. Chem. Soc., vol. 47, pages 245–54 (1925).
Boekelheide: J. Am. Chem. Soc. vol. 69, pages 790–792 (1947).
Bachmann: J. Am. Chem. Soc., vol. 73, page 51 (1951).